Sept. 23, 1958     A. WEXLER     2,853,094

VACUUM SEAL-OFF AND SAFETY VALVE

Filed April 15, 1955

WITNESSES
Robert C. Baird
Wm. B. Sellers.

INVENTOR
Aaron Wexler.
BY
Paul E. Friedemann
ATTORNEY

United States Patent Office 2,853,094
Patented Sept. 23, 1958

2,853,094
VACUUM SEAL-OFF AND SAFETY VALVE

Aaron Wexler, Pittsburgh, Pa., assignor to Westinghouse Electric Corporation, East Pittsburgh, Pa., a corporation of Pennsylvania Application April 15, 1955, Serial No. 501,569

4 Claims. (Cl. 137—467)

My invention relates, generally, to pressure responsive mechanisms, and more particularly to a vacuum seal-off and safety valve.

The vacuum seal-off and safety valve of this invention is especially adapted to provide pressure relief in transfer systems for low boiling point liquids, for use in connection with containers holding a low boiling point liquid and for use in vacuum systems in which it is possible for excess pressures to develop. In such applications, a very simple valve is required which in addition is helium leak detector tight, and invariably and reliably opens at a given fluid pressure.

Frequently systems of the type mentioned are equipped with rupture type valves. These have two fundamental disadvantages. In the first place, it is not possible to test the rupture pressure directly, except by destroying the rupture element. Hence, the rupture pressure must be inferred from the behavior of similar elements. Secondly, it is necessary to insert a replacement element once rupture has occurred. Sometimes pressure relief is effected by a rubber stopper forced into a hole communicating with the system to be protected. Such devices, by way of example, are used in some types of pressure cookers. Depending on frictional forces, the opening pressure is not reproduceable.

The permanent evacuation of various containers such as electronic tubes, vacuum insulated containers, ignitron type rectifiers, etc., represents an activity of widespread application. Most frequently the seal-off and pumping means for evacuating such containers comprises a constricted glass tube which is fused shut after evacuation is completed. Another means sometimes employed is a tube of soft metal such as lead or annealed copper. The tube is closed by a pinching tool which makes the metal flow together. Frequently the joint so produced is drowned in soft solder as an additional safeguard against leakage.

A primary disadvantage of the aforementioned methods is the relatively low rate of flow of liquid through the opening before seal-off. Generally this is the limiting factor in the speed of evacuation of a container. Further, if re-evacuation is required, considerable effort and, in some cases, new seals are required. Finally the sealing techniques of the prior art do not involve the safety feature of a pressure relief valve, which is especially valuable in applications involving such refrigerants as liquid hydrogen and liquid helium.

One broad object of my invention is the provision of convenient, compact, and inexpensive means for the rapid evacuation to a low pressure of various containers and to provide for the sealing of the vacuum therein.

It is also an object of my invention to provide a positively and rapidly acting relief valve which relieves the fluid pressure in a system when the pressure in the system approaches atmospheric pressure.

One further object of my invention is to provide a pressure responsive mechanism for rapidly relieving excess fluid pressure in a system when the fluid pressure rises to a predetermined value.

It is also an object of this invention to provide a safety valve which is usable on low pressure systems.

A specific object of this invention is to provide a safety valve having a fast opening characteristic.

The foregoing statements of objects are merely illustrative of the various aims and objects of this invention. Other objects and advantages will become apparent upon a study of the following specification when considered in conjunction with the drawing, in which.

The special problems arising in the transfer of liquid helium, liquid hydrogen, and other liquefied gases from the liquefier to a container, and from one container to another gave rise to the development of my special valve. However, my valve is not limited in its application to this field.

Figure 5:
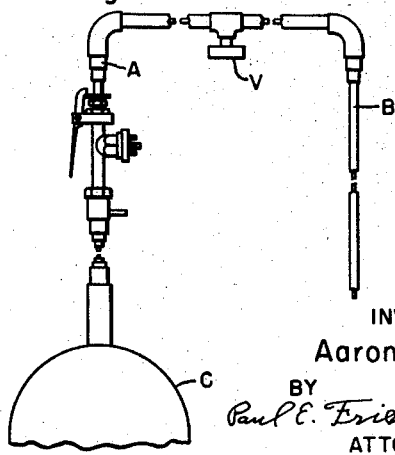
Fig. 5 shows my valve as applied to a liquid gas transfer arrangement for liquid gas storage containers.

In the transfer apparatus impliedly referred to in the preceding paragraph and shown in Fig. 5, there appeared a great need for a very simple vacuum seal-off and safety valve to cope with the potential dangers associated with the building up of excessively high pressures. Such pressures may develop when condensed air, which may result from air leaking into the system when a portion of it is at liquid helium temperatures, evaporates and expands. This is particularly dangerous in the case of transfer tubes, as shown in Fig. 5, which, tending to straighten out in the manner of a Bourdon tube, may well constitute one of the hazards to laboratory personnel.

When a container is to be evacuated the bonnet 1 is secured in a gas tight manner to the valve body 2 by means of the O ring 3. This O ring, which may be neoprene, rubber, or some other resilient material that does not in use lose its resilient sealing properties, fits snugly into its groove in the bonnet 1, and fits in a gas tight manner about the skirt 4 of the valve body 2. The stem 5 passes through the sealing gland shown and is sealed against the bonnet by the O ring 6.

Figure 4:
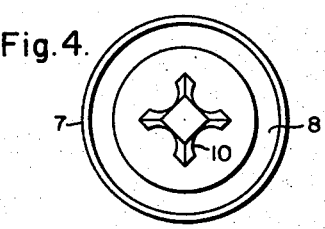
Fig. 4 is a plan view of the movable portion of the valve.

The upper end of the stem is threaded into the bottom of the movable element, or valve, 7. The outside diameter of the valve 7 fits loosely under and into the skirt 4. The upper surface of the valve is provided with a groove 8 for receiving the O ring 9. The upper portion of valve 7 is provided with a fluted projection 10 of polygonal shape. The shape is preferably, as shown most clearly in Fig. 4, so as to fit into the neck 18 of the valve body 2. The neck 18, it will be noted, has a square transverse opening section.

The stem 5 has the ring-like spider 11 secured to it as shown. The spider 11 acts as a guide for the stem and valve in the bonnet so that when the valve 7 is moved upwardly it will properly enter under and into the skirt 4.

Figure 1:
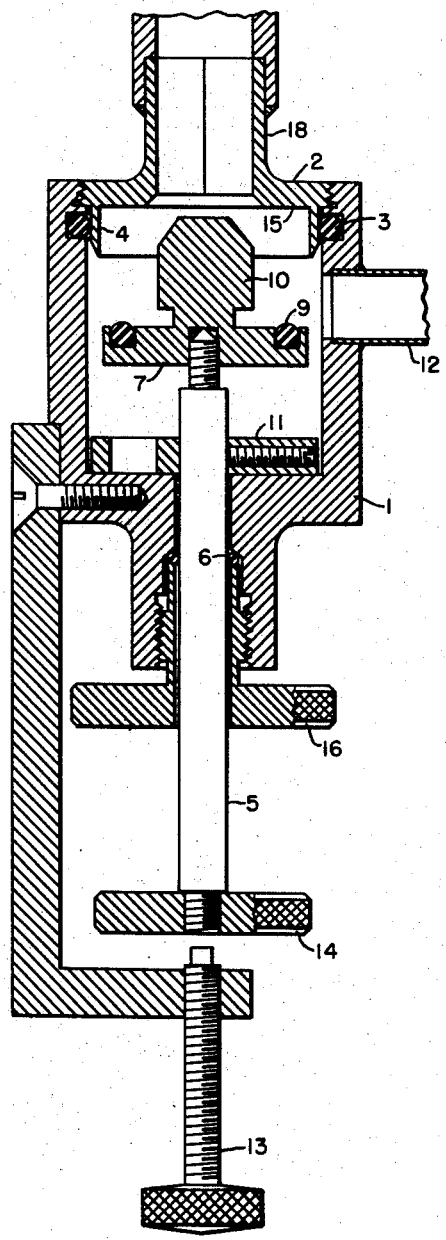
Figure 1 is a longitudinal sectional view of my valve as used with certain mechanisms for evacuating a container.
Figure 2:
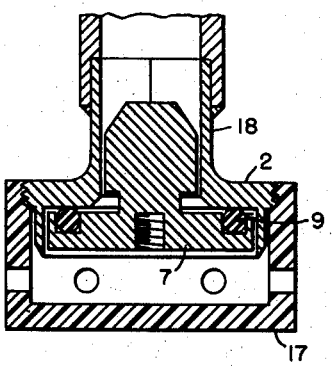
Fig. 2 is a longitudinal sectional view of my valve as used as a seal-off and safety valve for a pressure system.
Figure 3:
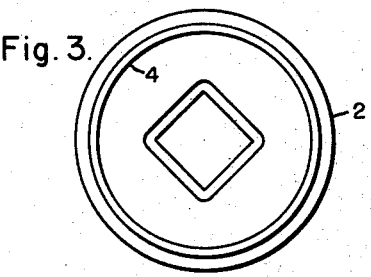
Fig. 3 is a bottom view of the valve body on which the valve seat is located.

In operation, when the elements are all in the position shown in Fig. 1 and the assembly at the neck 18 is connected to a container to be evacuated, the evacuating pump is connected to pipe 12 and evacuation is effected. When the system is at a proper low pressure, that is, at a relatively high vacuum, then screw 13 is moved up against the handle 14 and the stem is forced up so that the valve 7 is moved up to make the O ring 9 seat on the valve seat 15. When a helium leak-tight seal has been established between the valve and valve body at O ring 9 and seat 15, the screw 16 is backed out some to break the seal at the O ring 6, the screw 13 is backed off to the position shown, the handle 14 is turned to unscrew the valve 7 from the upper end of stem 5. The fluted projection 10, fitting into polygonal internal portion of the neck 18 prevents any rotary movement of the valve and thus does not in the least interfere with the seal established by the valve.

When the stem 5 has been unscrewed the handle 14 is moved down to the position shown. The evacuating pump is disconnected from the pipe 12 and the bonnet 1 is unscrewed and removed from the valve body.

The valve body 2 and valve 7 are both preferably made of brass. To provide for easy inspection of the seal and to prevent loss of the valve 7, a transparent plastic cap 17, perforated as shown to admit atmospheric pressure to the bottom of the valve, is screwed to the valve body. The cap 17 may be of Lucite or some other equally transparent plastic material.

This simple valve structure provides a gas-tight seal under normal operating conditions and opens the system to the atmosphere quickly when a pressure above atmospheric pressure occurs in the neck 18 above the valve 7.

The perforations in the cap 17 admit atmospheric pressure below the valve 7 and this atmospheric pressure thus provides a helium leak detector tight seal when a good vacuum obtains in the system to which the valve is attached. Should the pressure in the system begin to approach atmospheric the valve 7 would drop off and is caught in the plastic cap 17.

In Fig. 5 the evacuated container is designated by C and into the double jacketed piping system A and B leading from container C to some other container or place of use, my seal-off and safety valve assembly V is connected as shown.

While I have shown but one embodiment of my invention, it will be appreciated by those skilled in the art that variations in structural arrangements and in the details of the parts may be made without departing from the spirit and scope of this invention. Accordingly, it is intended that the foregoing disclosure shall be considered only as illustrative of the principles of my invention and not interpreted in a limiting sense.

I claim as my invention:

1. In a valve assembly, the combination of, a valve body having a nipple in use connected to a region of pressure lower than atmospheric pressure, said nipple having an internal longitudinal opening polygonal in cross section, a valve seat of relatively large diameter in the valve body, and a valve having a mating central guiding stem fitting with clearance at the side into the polygonal opening in the nipple, and adapted to seat on the valve seat whereby atmospheric pressure holds the valve on the seat, and a perforated transparent cap, preferably of Lucite, disposed on the valve body over the outer portion of the valve so that the seal of the valve on its seat may be inspected and the valve is not lost when it unseats by a rise of pressure in the nipple greater than atmospheric pressure.

2. A valve assembly, in combination, a valve body having an outer threaded periphery for receiving a valve cap, a perforated transparent plastic valve cap disposed on the threads, a circular skirt depending from the body adjacent the threads, a horizontal flat circular downwardly facing valve seat adjacent the skirt, a neck projecting upwardly of the central portion of the body, said neck having a longitudinal opening therethrough, a cylindrical valve adapted to fit with a relatively small clearance under the skirt, a groove disposed in the upper surface of the valve near the periphery of the valve for receiving an O ring, an O ring of suitable resilient material not materially affected in its sealing effect by extremely low temperatures, disposed in the groove to thus with the valve seat on the valve body provide a seal-off and safety valve for an evacuated container that would in use of the valve be connected to the neck of the valve body, said valve having a central projection on its upper surface, said projection fitting into the longitudinal opening in the neck of the valve body to thus provide a longitudinal valve guide.

3. A valve assembly, in combination, a valve body having an outer threaded periphery for receiving a valve cap, a perforated transparent plastic valve cap disposed on the threads, a circular skirt depending from the body adjacent the threads, a horizontal flat circular downwardly facing valve seat adjacent the skirt, a neck projecting upwardly of the central portion of the body, said neck having a longitudinal opening therethrough, the internal transvere sectional area of the opening being square in shape, a cylindrical valve adapted to fit with a relatively small clearance under the skirt, a groove disposed in the upper surface of the valve near the periphery of the valve for receiving an O ring, an O ring of suitable resilient material not materially affected in its sealing effect by extremely low temperatures, disposed in the groove to thus with the valve seat on the valve body provide a seal-off and safety valve for an evacuated container that would in use of the valve be connected to the neck of the valve body, said valve having a fluted central projection on its upper surface, said projection, except for the flutes, having a square transverse section, fitting into the longitudinal opening in the neck of the valve body to thus provide a longitudinal valve guide and prevent turning of the valve.

4. In a valve assembly, a valve body having an upper sleeve-like neck of relatively small transverse outside diameter subjected to a relatively low fluid pressure in the neck, a lower portion of larger diameter, a skirt depending from the lower portion and a horizontal valve seat adjacent the inner portion of the skirt, a cylindrical valve fitting into the skirt, a valve seat element in the upper surface of the valve coacting with the valve seat in the body to provide a seal-off and safety valve for the neck with which the valve is used, said valve having an axial length just a trifle less than the length of the skirt, a perforated transparent valve cap on the valve body disposed to house the valve, whereby a mere inspection of the valve body will indicate the condition of the seal, namely if the valve is in view it is known that the seal is broken whereas if the valve is not disposed in the cap the seal is still effective.

References Cited in the file of this patent

UNITED STATES PATENTS

| | | |
|---|---|---|
| 222,975 | Zwietusch | Dec. 23, 1879 |
| 1,159,518 | Maul | Nov. 9, 1915 |
| 2,247,568 | Armbrust | July 1, 1941 |
| 2,417,494 | Hoof | Mar. 18, 1947 |
| 2,496,470 | Hodsdon | Feb. 7, 1950 |
| 2,676,560 | Thomas | Apr. 27, 1954 |

FOREIGN PATENTS

| | | |
|---|---|---|
| 12,143 | Great Britain | 1890 |